R. K. PARENT.
TRUCK AND WAGON DUMP.
APPLICATION FILED JUNE 9, 1920.

1,436,051.

Patented Nov. 21, 1922.
2 SHEETS—SHEET 1.

Inventor
Ralph K. Parent,

By Hood & Schley
Attorneys

R. K. PARENT.
TRUCK AND WAGON DUMP.
APPLICATION FILED JUNE 9, 1920.
1,436,051. Patented Nov. 21, 1922.
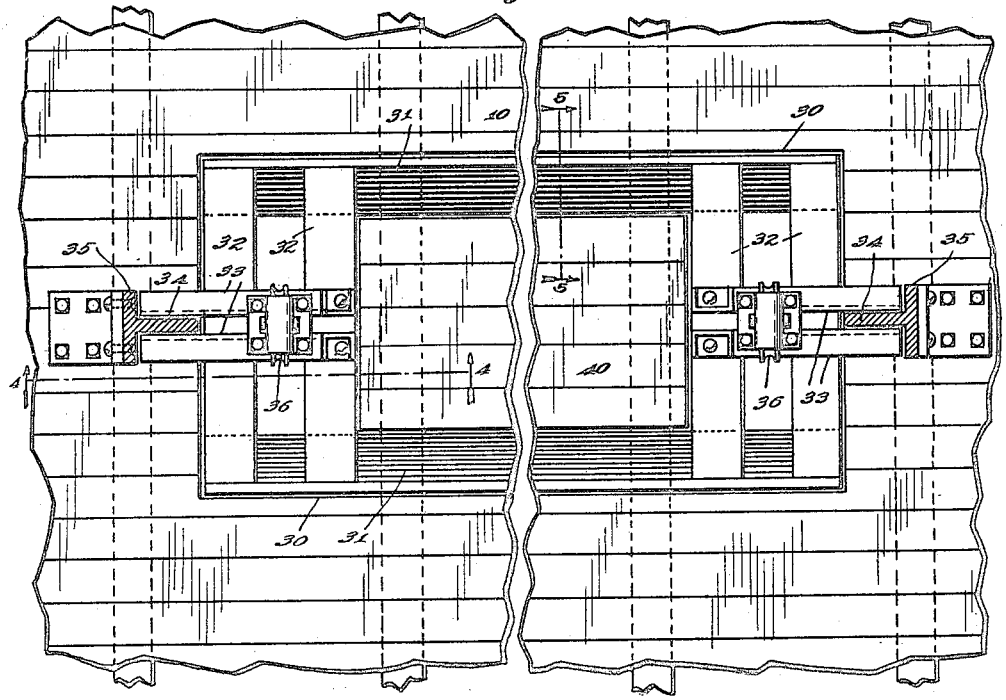
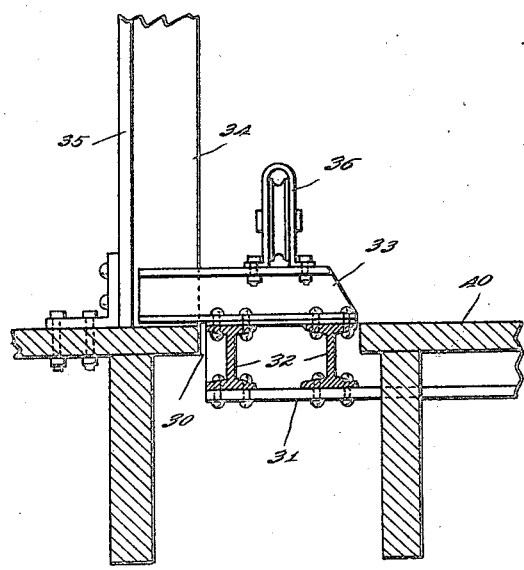
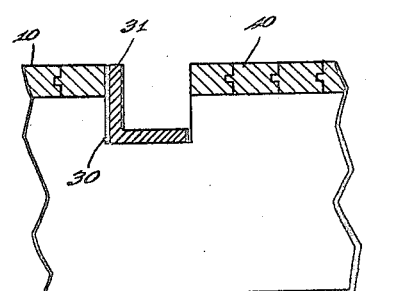
Inventor
Ralph K. Parent,
By Hood & Schley
Attorneys Patented Nov. 21, 1922.

1,436,051

UNITED STATES PATENT OFFICE.

RALPH K. PARENT, OF UNION CITY, OHIO.

TRUCK AND WAGON DUMP.

Application filed June 9, 1920. Serial No. 387,603.

*To all whom it may concern:*

Be it known that I, RALPH K. PARENT, a citizen of the United States, residing at Union City, in the county of Darke and State of Ohio, have invented a new and useful Truck and Wagon Dump, of which the following is a specification.

In the average small country grain elevator, there is an equipment provided for dumping ordinary farm wagons loaded with grain, such equipment comprising an elevated hoisting drum and a pair of dumping cables, each of which is provided at its lower end with a ring or eye which may be easily slipped over the outer ends of the hubs of the front wheels of the wagon, so that the wagon may thus be lifted at its forward end to cause dumping.

At the present time, there is a gradual increase of use of automobile trucks by farmers, and the object of my present invention is to provide a device which may be readily used in conjunction with the above-mentioned existing wagon-dumping mechanism, by which the contents of automobile trucks may be as readily dumped.

Figure 1:
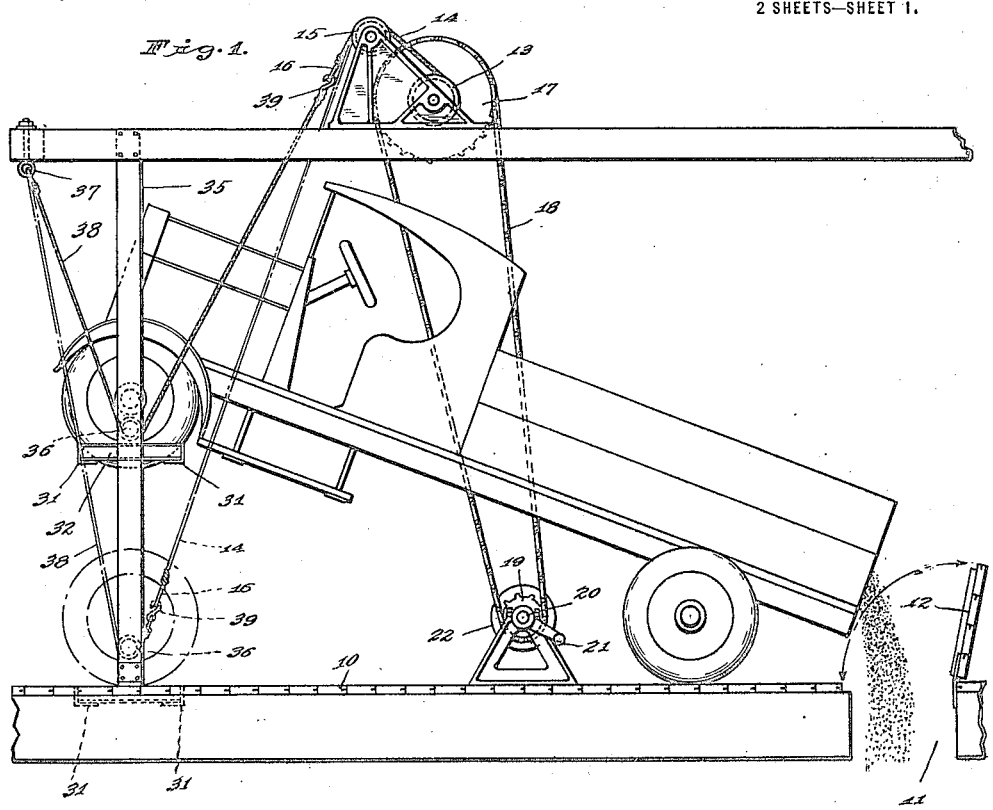
Figure 2:
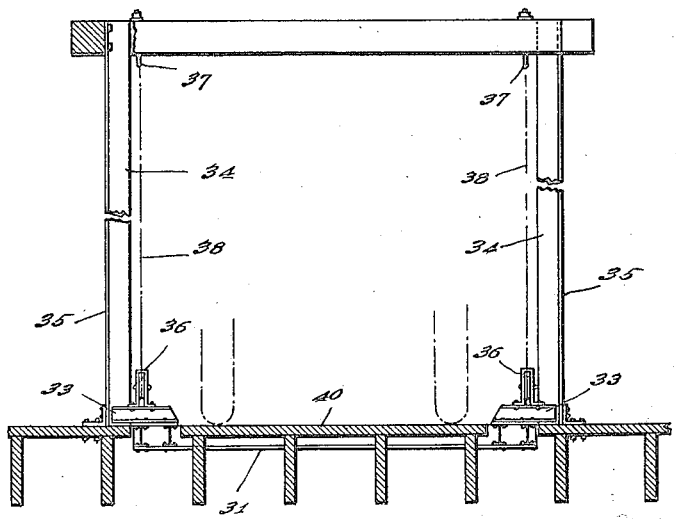

The accompanying drawings illustrate my invention. Fig 1 is a side elevation, largely diagrammatic in character, of my improvement; Fig. 2 a vertical section at right angles to the plane of Fig. 1; Fig. 3 a fragmentary plan of the cradle which is provided for the reception of the front wheels of automobile trucks, and the adjacent floor space; Fig. 4 a fragmentary section on line 4—4 of Fig. 3; and Fig. 5 a fragmentary section on line 5—5 of Fig. 3.

In the drawings, 10 indicates the usual dumping floor provided with a receiving opening 11, closed by a trap door 12. At an elevated point the winding drum 13 is mounted and provided with two hoisting cables 14 (only one of which is shown) each passed over an idler 15 and provided at its free end with an eye 16 adapted to be slipped over the outer end of the hub of a front wheel of an ordinary farm wagon. Drum 13 is driven by any suitable means, as, for instance, sprocket wheel 17, chain 18, sprocket wheel 19, and shaft 20, equipped either with a hand crank 21 or pulley 22, which may be belted to a suitable source of power.

For the purpose of utilizing the above-mentioned structure, which is common, for handling of automobile trucks, I form an opening 30 in which I mount a cradle comprising the two parallel side angle irons 31, 31, connected at their ends by I beams 32, 32, the inner I beams 32 being spaced apart a distance greater than the distance between the outer faces of the front wheels of an automobile truck and the side irons 31, 31 being spaced apart a distance somewhat less than the diameter of the normal front wheels of such trucks, so that such wheels may be cradled between the side irons 31, as indicated in Fig. 1.

Secured to each pair of I beams 32 is a pair of channel irons 33, 33 which are extended beyond each end of the cradle, so as to receive the stem 34 of a vertically placed T-beam 35, and be thereby guided in vertical movement.

Attached to each pair of channel irons 33 is a pulley block 36. Attached at an elevated point 37 substantially in the vertical plane of each pulley block 36, is one end of a cable 38 which is passed beneath the adjacent pulley block 36 and is provided at its free end with a hook 39 which may be readily hooked into eye 16, the arrangement being such that an automobile truck having been driven to position with its front wheels lying between side arms 31, and resting upon platform 40 which fills the space between said side irons and the inner I beams 32, hooks 39 may be hooked into eyes 16 and cables 14 then wound up on drum 13 so as to lift cradle 31—32 and lift the automobile to the position shown in Fig. 1, the cradle 31—32 serving to retain the truck in longitudinal position.

It will be noted that by the above arrangement, the existing hoisting mechanism, which is properly proportioned to be able to lift the front end of the ordinary farm wagon when loaded, is also available, by reason of the multiplying action of cables 38 upon the cradle 31—32, to as readily lift the forward end of the much heavier loaded automobile truck, and as a consequence, the operator of the elevator is able to handle trade coming to him both by way of the ordinary farm wagon and by way of automobile truck.

I claim as my invention:

1. Vehicle dumping apparatus comprising a winding drum, a pair of suspended hoisting cables equipped with means for engagement with the forward end of a wagon, a vertically movable cradle adapted to receive the forward end of an automobile truck, and means associated with said cradle for connection with said hoisting cables.

2. Vehicle dumping apparatus comprising a winding drum, a pair of suspended hoisting cables equipped with means for engagement with the forward end of a wagon, a vertically movable cradle adapted to receive the forward end of an automobile truck, and a pair of lifting cables attached to a fixed support at one end, passed beneath pulley blocks on the cradle, and provided with means at their free ends for attachment with said hoisting cables.

In witness whereof, I have hereunto set my hand at Union City, Indiana, this 5 day of June, A. D. one thousand nine hundred and twenty.

RALPH K. PARENT.